United States Patent
Ring et al.

(10) Patent No.: US 12,236,384 B1
(45) Date of Patent: Feb. 25, 2025

(54) MODEL AUTOMATION

(71) Applicant: Wells Fargo Bank, N.A., San Francisco, CA (US)

(72) Inventors: Samuel Sender-Levi Ring, San Francisco, CA (US); Joel Toms, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 386 days.

(21) Appl. No.: 17/809,147

(22) Filed: Jun. 27, 2022

(51) Int. Cl.
*G06Q 10/067* (2023.01)

(52) U.S. Cl.
CPC ................................. *G06Q 10/067* (2013.01)

(58) Field of Classification Search
CPC .................................................... G06Q 10/067
See application file for complete search history.

(56) References Cited

U.S. PATENT DOCUMENTS

| | | | |
|---|---|---|---|
| 3,358,339 A | 12/1967 | Strehlein | |
| 3,422,551 A | 1/1969 | Blank | |
| 8,332,864 B2 | 12/2012 | Bose et al. | |
| 10,963,231 B1* | 3/2021 | Singh | G06F 8/60 |
| 11,074,107 B1 | 7/2021 | Nandakumar | |
| 11,816,618 B1* | 11/2023 | Cheek, Jr. | G06T 3/40 |
| 11,900,169 B1* | 2/2024 | Dhandhania | G06F 9/505 |
| 2002/0026507 A1* | 2/2002 | Sears | H04L 41/22 |
| | | | 709/224 |
| 2009/0087822 A1* | 4/2009 | Stanton | G09B 19/06 |
| | | | 434/156 |
| 2015/0052239 A1* | 2/2015 | Lamarca | H04L 41/5029 |
| | | | 709/224 |
| 2018/0165604 A1 | 6/2018 | Minkin et al. | |
| 2019/0095557 A1 | 3/2019 | Sehgal et al. | |
| 2019/0272590 A1 | 9/2019 | Lin et al. | |
| 2019/0340518 A1 | 11/2019 | Candido et al. | |
| 2020/0285899 A1 | 9/2020 | Chen et al. | |
| 2020/0344185 A1 | 10/2020 | Singaraju et al. | |

(Continued)

FOREIGN PATENT DOCUMENTS

| | | |
|---|---|---|
| WO | 2020/036590 A1 | 2/2020 |
| WO | 2021/034932 A1 | 2/2021 |

OTHER PUBLICATIONS

Al-Shabandar et al., "The Application of Artificial Intelligence in Financial Compliance Management," AIAM' 19: 2019 International Conference on Artificial Intelligence and Advanced Manufacturing, Oct. 17-19, 2019, Dublin, Ireland, ACM, 6 pages, https://doi.org/10.1145/3358331.3358339.

(Continued)

*Primary Examiner* — Daxin Wu
(74) *Attorney, Agent, or Firm* — Merchant & Gould P.C.

(57) ABSTRACT

An example system can include: at least one processor; and non-transitory computer-readable storage storing instructions that, when executed by the at least one processor, cause the system to: generate a configuration manager programmed to configure a workstream including a plurality of models, wherein the workstream defines metadata associated with execution of each of the plurality of models; generate an execution manager programmed to execute each of the plurality of models in the workstream according to the metadata; and generate a results manager programmed to access results of the execution of the workstream.

18 Claims, 15 Drawing Sheets

(56) References Cited

U.S. PATENT DOCUMENTS

| | | | |
|---|---|---|---|
| 2020/0356362 A1* | 11/2020 | Thiyagarajah | G06Q 10/067 |
| 2021/0042674 A1 | 2/2021 | Chan | |
| 2021/0089944 A1 | 3/2021 | Zhou et al. | |
| 2021/0192437 A1 | 6/2021 | Dhandapani et al. | |
| 2021/0255886 A1* | 8/2021 | Von Niederhausern | G06F 16/90335 |
| 2021/0294580 A1 | 9/2021 | Oburu et al. | |
| 2021/0390455 A1 | 12/2021 | Oglesby et al. | |
| 2022/0108223 A1* | 4/2022 | Capelo | G06N 20/00 |
| 2022/0342697 A1* | 10/2022 | MacFarlane | G06F 11/3612 |
| 2023/0306314 A1* | 9/2023 | Chandrasekaran | G06N 20/20 |

OTHER PUBLICATIONS

Papadimitriou et al., "A Multi-Faceted Approach to Large Scale Financial Forecasting," ACM International Conference on AI in Finance (ICAIF '20), Oct. 15-16, 2020, New York, NY, USA. ACM, 8 pages, https://doi.org/10.1145/3383455.3422551.

* cited by examiner

FIG. 10

Data Management | Model Management | Workstream Management | Execution | Report Viewer Cycle: CCAR 2021
Run Cart: Demo Run Cart ☐ Item Number | Workstream Name | Version

Add Run Item
Workstream: International Payments ▶
Version: Initial Version v1.1 ▶
Scenario: Base ▶

Tags

| Priority | Category | Exclusive | Tag |
|---|---|---|---|
| 1 | GDP | Y | 1;+10% |
| 2 | Wire Fees | N | 3;+1bp |

Comments: Demo Run Item

Add  Cancel 900, 904, 1004, 1010, 1012

MODEL AUTOMATION

BACKGROUND

Enterprises use computer models to predict outcomes based on large quantities of data. The predicted outcomes can be used to create and modify products and services for customers, manage risk, communicate with customers and other parties, and so forth. Typically, large enterprises create, train, test, score and monitor many models for many projects. It can be difficult to manage all the models in a cohesive and efficient manner.

SUMMARY

Embodiments of the disclosure are directed to the automation and orchestration of models.

According to aspects of the present disclosure, an example system can include: at least one processor; and non-transitory computer-readable storage storing instructions that, when executed by the at least one processor, cause the system to: generate a configuration manager programmed to configure a workstream including a plurality of models, wherein the workstream defines metadata associated with execution of each of the plurality of models; generate an execution manager programmed to execute each of the plurality of models in the workstream according to the metadata; and generate a results manager programmed to access results of the execution of the workstream.

In another aspect, an example computer implemented method can include: generating a configuration manager programmed to configure a workstream including a plurality of models, wherein the workstream defines metadata associated with execution of each of the plurality of models; generating an execution manager programmed to execute each of the plurality of models in the workstream according to the metadata; and generating a results manager programmed to access results of the execution of the workstream.

The details of one or more techniques are set forth in the accompanying drawings and the description below. Other features, objects, and advantages of these techniques will be apparent from the description, drawings, and claims.

DESCRIPTION OF THE DRAWINGS

FIG. 10 shows another example user interface generated by the orchestration server of FIG. 2.

DETAILED DESCRIPTION

Embodiments of the disclosure are directed to the automation and orchestration of models.

Business enterprises, such as financial institutions, utilize computer models to predict outcomes. Typically, in order for an enterprise to develop, test and run a model, the model must be onboarded to a computing environment generated and managed by the enterprise. Such onboarding can be a highly time consuming process.

Further, such models are typically used in tandem with other models to generate desired outcomes. The models may be manually-executed and difficult to configure and stage with other models. This can be particularly true for legacy models that run on specific software platforms.

Generally, the example systems provided herein create workstreams, which involve constructing the execution of a model or a series of models in a user interface. Inputs associated with the requirements for each model can be selected. A routing service then triggers orchestration of the run of the model or series of models within the workstreams.

More specifically, in the examples herein, the orchestration of the models can involve obtaining metadata from a database for the selected models, workstreams, and model inputs. An acyclic graph of model dependencies can be constructed to define each model's execution within the workstream. The system can then stage the models of the workstream for execution. Nodes run the models and send back model outputs. The outputs are tagged and stored in a database. The results of the workstream can then be exposed to the user.

By automating the execution and orchestration of the models within the workstreams, several advantages and practical applications are realized. For example, embodiments of the present disclosure enhance the efficiencies associated with running the models, particularly for models on different legacy platforms.

Further practical applications can include automation in the handling of models within workstreams, thereby increasing efficiencies. Such automation can include interfaces used to manipulation the models within workstreams, along with defining metadata associated with the models and versioning of the models, workstreams, and/or execution. Many other technical advantages can be associated with the examples provided herein.

Figure 1:
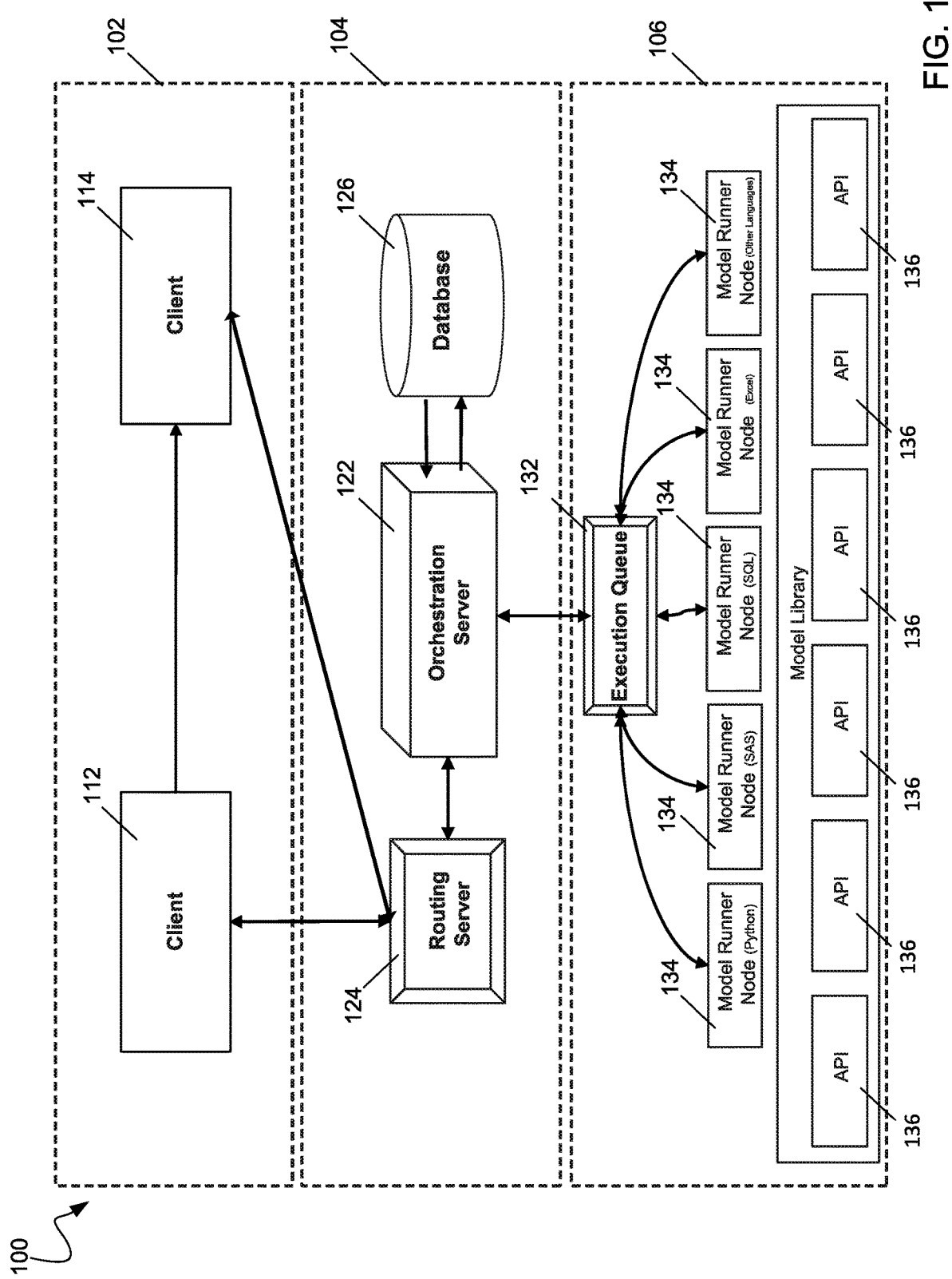
FIG. 1 shows an example system programmed to automate and orchestrate models.

FIG. 1 schematically shows components of an example system 100 that is programmed to automate and orchestrate various models within a workstream.

The system 100 generally includes a client layer 102, an orchestration layer 104, and an execution layer 106. The components of the system 100 can include one or more computing device, such as laptops, desktops, tablets, servers, server farms, etc. Each of the computing devices includes one or more storage media encoding instructions which, when executed by one or more processors, implement the functionality described herein.

Although multiple computing devices are shown in system 100, the functionality described herein can be implemented on one or many computing devices. In such examples, each of the computing devices communicate with the others through a network. The network can be any suitable data network, such as the internet, a wide area network, a local area network, a wired network, a wireless network, a cellular network, a satellite network, a near field communication network, or any operatively connected combination of these.

In the example shown, the client layer 102 of the system includes client devices 112 and 114. In different examples, the client devices 112, 114 can be the same computing device or separate computing devices or a plurality of devices that numbers in the hundreds or thousands.

The client device 112 is programmed to allow a user to interface with the orchestration layer 104. This can include, without limitation, selecting models and/or workstreams for execution. The client device 112 can further be used to manipulate individual models and/or workstreams as desired. Examples of such interfaces are provided in FIGS. 3-14.

The client device 114 is programmed to allow a user to expose the results of model execution. This can include retrieval of the model and/or the results of a workstream from the orchestration layer. For instance, the client device 114 can access or export the results of a workstream involving multiple models.

The orchestration layer 104 of the system 100 includes an orchestration server 122 programmed to organize the models associated with the execution of one or more workstreams. This can include the functionality described in FIGS. 3-8 below, which can involve the acyclic construction of model dependencies, workstream versioning, and/or a definition of model inputs and outputs.

The definition of the inputs and outputs of models can involve the orchestration server 122 managing metadata associated with each model and/or placement of the model in conjunction with other models for execution of the workstream. Examples of the metadata associated with a particular model can include one or more of: the defined inputs and outputs for the model; versioning for the model; and dependencies for the model.

This metadata associated with each model is captured by the orchestration server 122 and stored in a database 126. The orchestration server 122 queries the database 126 to access the metadata associated with the relevant models when a workstream is manipulated and executed. In some examples, the orchestration server 122 accesses the data stored in the database 126 using a series of Structured Query Language (SQL) commands or similar functionality.

The orchestration layer 104 can also include a routing server 124 that functions to route requests between the client devices 112, 114 and the orchestration server 122. For instance, there can be many client devices, and the orchestration server 122 can be implemented as a server farm or have a cloud computing architecture with many computing devices. The routing server 124 routes communications between the appropriate clients and servers to implement the functionality described herein.

The execution layer 106 of the system 100 can include an execution queue 132. The execution queue 132 allows the orchestration server 122 to stage models and the data associated therewith for execution of the workstream.

In the example shown, the execution queue 132 interfaces with a plurality of model runner nodes 134 that are configured to execute one more aspects of each of the models in the workstream that is staged in the execution queue 132.

As noted below, the system 100 can be programmed to execute models that are configured in different software languages and/or using different software applications. Each of the model runner nodes 134 is programmed to address a specific software language or software application associated with one or more of the models of the workstream that is staged in the execution queue 132.

For instance, the model runner nodes 134 can be programmed to execute models in one or more of the following software languages/applications: Python; SAS; SQL; and Excel. For instance, the model runner nodes 134 can allow the system 100 to automate the execution of legacy models written in different software languages or software applications.

More specifically, one of the model runner nodes 134 is programmed to automate the execution of Excel-based models. A significant number of existing Excel-based spreadsheets can be used in modeling, and these spreadsheets are typically not automated. In other words, to use an Excel-based spreadsheet for modeling, it can be necessary to manually enter data into the spreadsheet, cause the spreadsheet to conduct calculations, and manually extract the resulting data from the spreadsheet. Rewriting such spreadsheets to be automated can be prohibitive in terms of time, cost and availability of subject matter expertise.

To address such models, the example model runner node 134 is programmed to automate the execution of Excel-based models. This involves coordination of input, execution, and output of the models. Further transformation of the data can also be done as the data is exchanged between models. This can involve versioning control, which is described further below.

The example model runner node 134 is programmed to run legacy Excel-based spreadsheets programmatically and store the results. The model runner node 134 extracts the model from the Excel-based spreadsheets according to a defined object model and uses Excel's object model to programmatically execute the models against the corresponding data. The results from the execution of the object model can be stored as version-controlled objects (or data files) by the model runner node 134. In this manner, the model runner node 134 can programmatically execute a legacy model in an automated fashion as part of the workstream. Many other configurations are possible.

The execution layer 106 can also include a series of Application Programming Interfaces (APIs) 136 that allow the system 100 to interface with external clients and data sources. This can be used, for instance, to access external dependencies associated with a model of the workstream. One example of such external dependencies that can be accessed using the APIs 136 include, without limitation, a credit risk API that allows the execution queue 132 to access data associated with credit risks. Another example is a tax API that allows the execution queue 132 to access data associated with taxing. Many other APIs and configurations are possible.

For instance, external data sources can be registered with the APIs 136 to allow for access to data and/or metadata outside of the system 100. In this configuration, the models of the workstream can be isolated from retrieval of the data, thereby allowing the execution of the workstream in an agnostic manner regardless of the source of the data. Many other configurations are possible.

Figure 2:
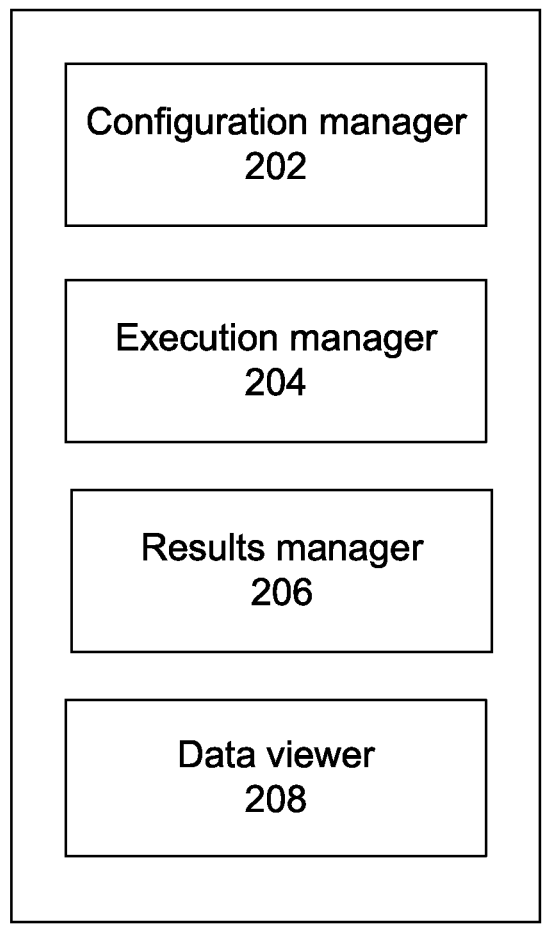
FIG. 2 shows example logical components of an orchestration server of the system of FIG. 1.

Referring now to FIG. 2, additional details about the orchestration server 122 are shown. In this example, the orchestration server 122 includes a configuration manager 202, an execution manager 204, a results manager 206, and a data viewer 208. Many other configurations are possible.

The configuration manager 202 of the orchestration server 122 allows for the configuration of a workstream including one or more models. This can include the selection of each of the models in the workstream, manipulation of the inputs and outputs of the models, and changes to the models themselves. Examples of this configuration are provided in FIGS. 3-8 below.

Further, the configuration manager 202 provides versioning of the workstream and the models therein. For instance, the configuration manager 202 can store versions of a specific model as the model is manipulated over time. This can include, without limitation, a formal versioning process where each iteration of a model is checked out, modified, and checked back into the configuration manager 202. Further, the configuration manager can store versions for each workstream including one or more models. For instance, as each workstream is manipulated, a version of each modification can be captures. This allows for the execution of a specific version of a model and/or a specific version of a workstream, as desired.

The execution manager 204 of the orchestration server 122 can be programmed to interface with the execution queue 132 to execute a workstream including one or more models. For example, when the client device 112 requests execution of the workstream, the execution manager 204 accesses the data associated with the workstream from the database 126 and sends that data to the execution queue 132 for execution. This data can include, without limitation, the models, the metadata associated with the models, inputs and outputs for the models, and any other dependencies required to execute each of the models in the requested workstream.

The results manager 206 of the orchestration server 122 can be programmed to interface with the database 126 to access the results of the execution of a workstream. For instance, upon execution of the workstream by the execution queue 132, the results of the workstream are stored in the database 126. This can include the output of each of the models associated with the workstream and any associated aspects of the execution, such as error messages, etc. The results manager 206 queries the database 126 to access the results.

Finally, the data viewer 208 of the orchestration server 122 can be programmed to provide an interface detailing the results of the workstream. In this example, the data viewer 208 is programmed to generate one or more interfaces for display on the client device 114.

Figure 3:
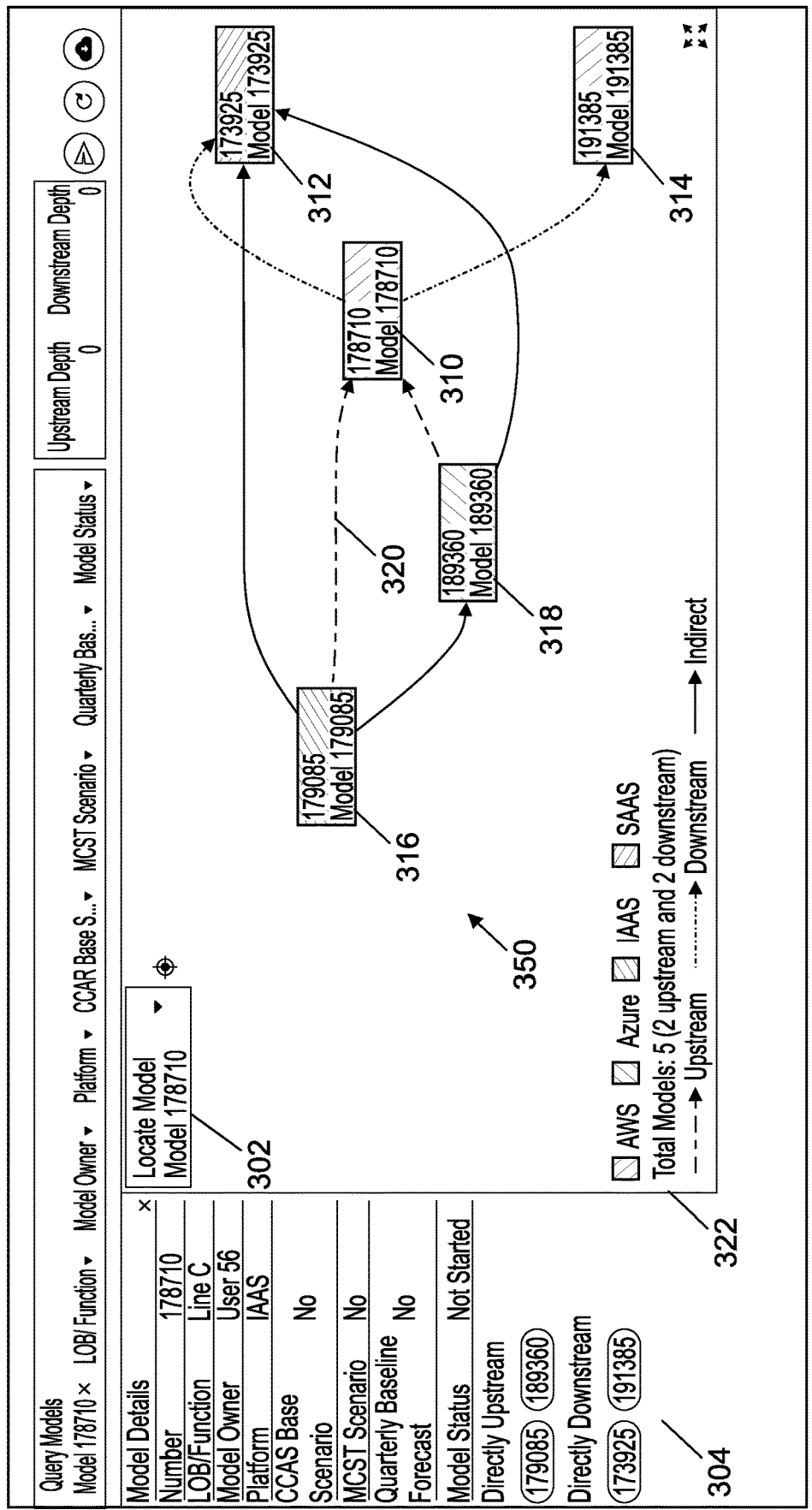
FIG. 3 shows an example user interface generated by the orchestration server of FIG. 2.

Referring now to FIG. 3, an example user interface 300 for depicting a workstream is shown. For example, the user interface 300 can be accessed from the orchestration server 122 by the client device 112.

In this example, the user interface 300 defines a workstream 350 associated with a plurality of models, in this instance 5 models. Generally, the user interface 300 provides a visual depiction of the workstream 350, including the dependencies associated with the models included in the workstream 350.

Within the user interface 300, a model locator box 302 functions to locate a particular model (e.g., "Model 178710") on the user interface 300. The model identified in the model locator box 302 is highlighted as selected model 310 on the user interface 300.

The user interface 300 also includes a details pane 304 that provides information about the selected model 310. This information can include, without limitation: model name; line-of-business associated with the model; owner; and model dependencies (upstream and downstream).

Each of the models 310-318 in the workstream 350 depicted by the user interface 300 is shown in relation to one another in space. For instance, the models 312, 314 are shown downstream of the model 310, and the models 316, 318 are shown upstream of the model 310.

Lead-lines between each of the models 310-318 on the user interface 300 further define the dependencies between each of the models. For instance, a lead-line 320 from the model 316 to the model 310 illustrates that an output of the model 316 is feed as an input to the model 310. The lead-lines can include arrows to indicate data flow and be color-coded to indicate upstream or downstream flow.

An optional legend 322 is also provided on the user interface 300. The legend 322 provides information associated with the workstream 350 depicted by the user interface 300, such as the source and connections for data associated with each of the models. In this example, the data is found on various platforms, such as Amazon Web Services, Microsoft Azure, and SAAS. These are examples, and many other configurations are possible.

FIGS. 4-14 illustrate example user interfaces that can be generated by the orchestration server 122 during the definition, manipulation, and execution of workstreams.

Figure 4:
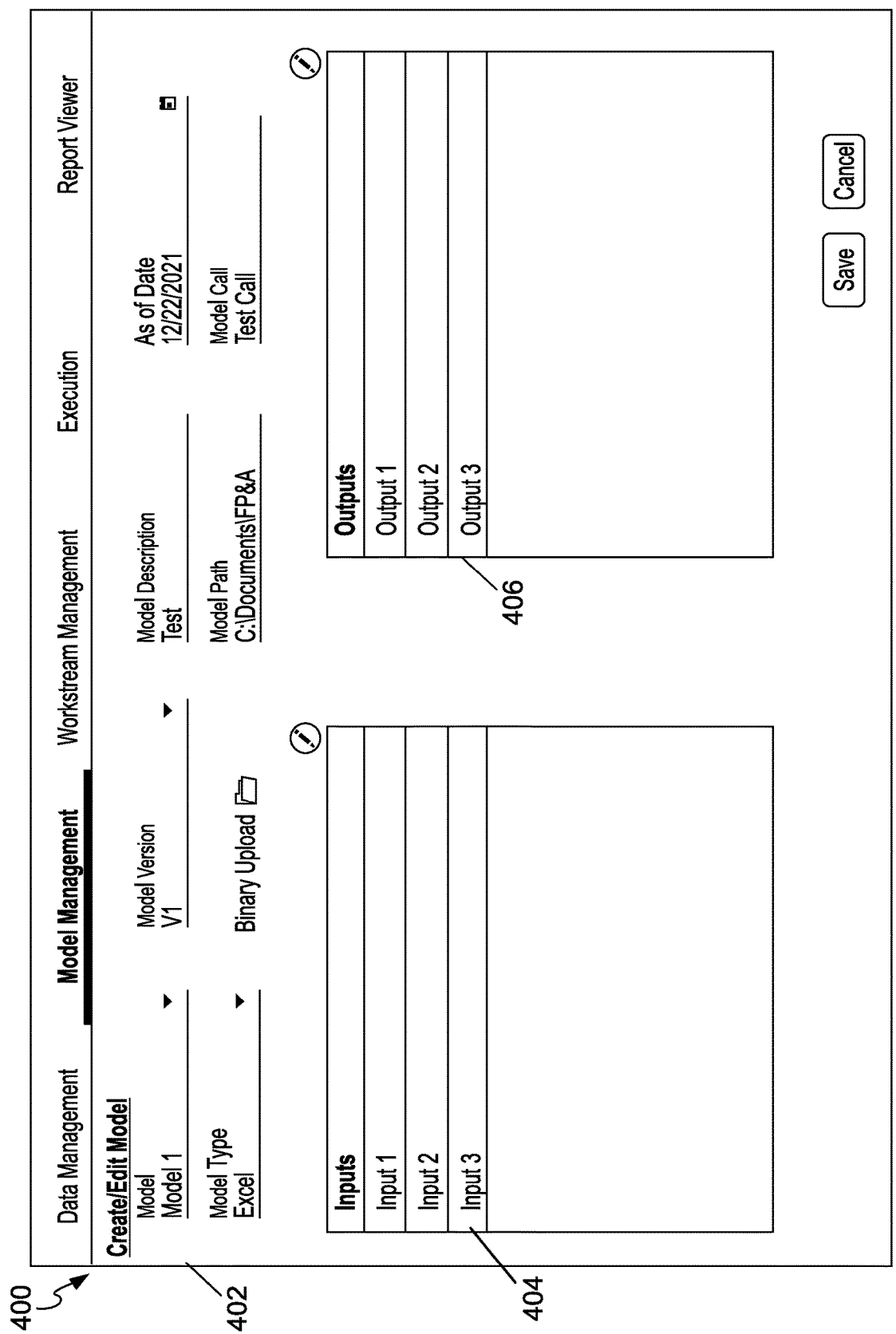
FIG. 4 shows another example user interface generated by the orchestration server of FIG. 2.
Figure 5:
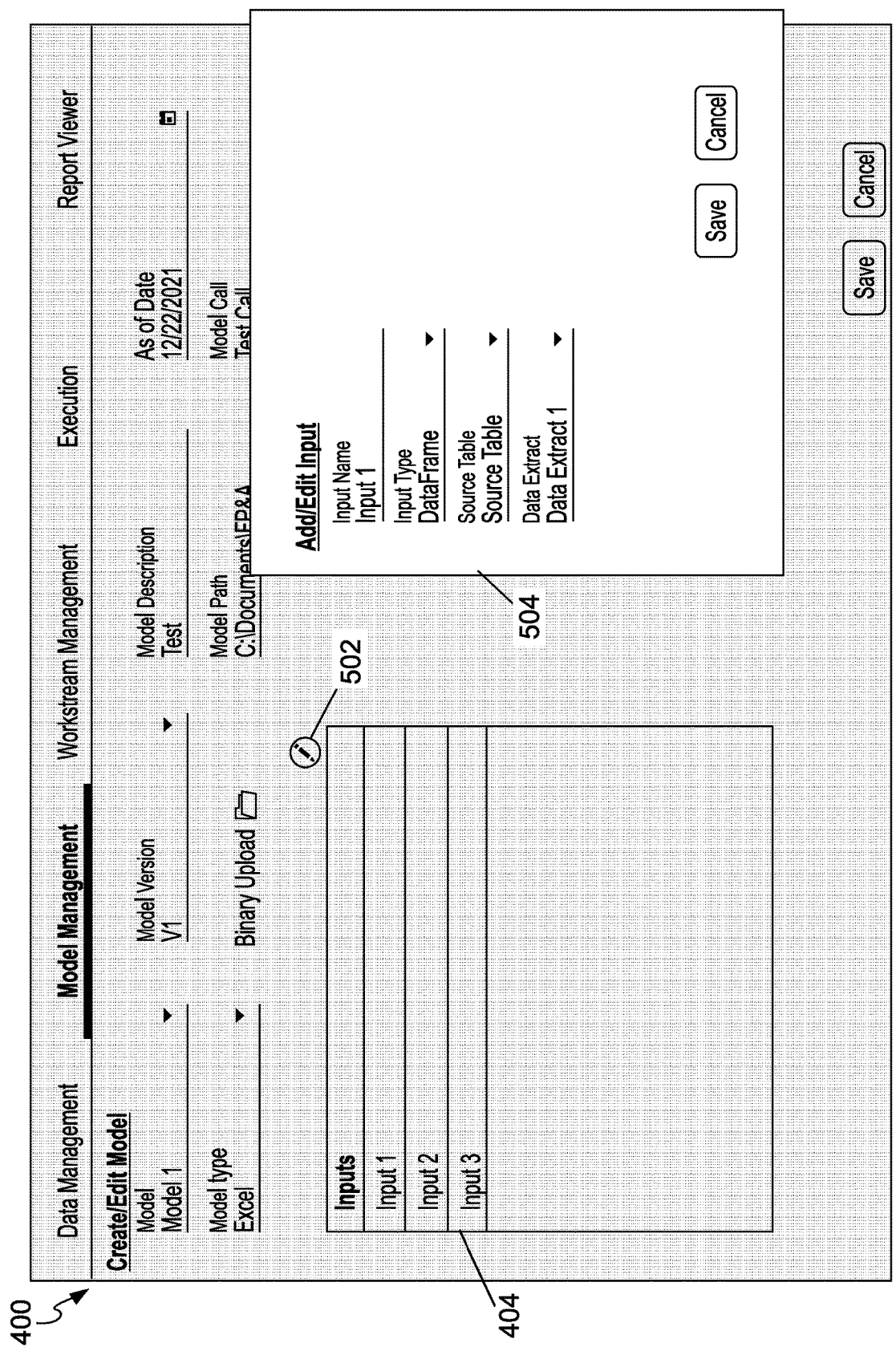
FIG. 5 shows another example user interface generated by the orchestration server of FIG. 2.
Figure 6:
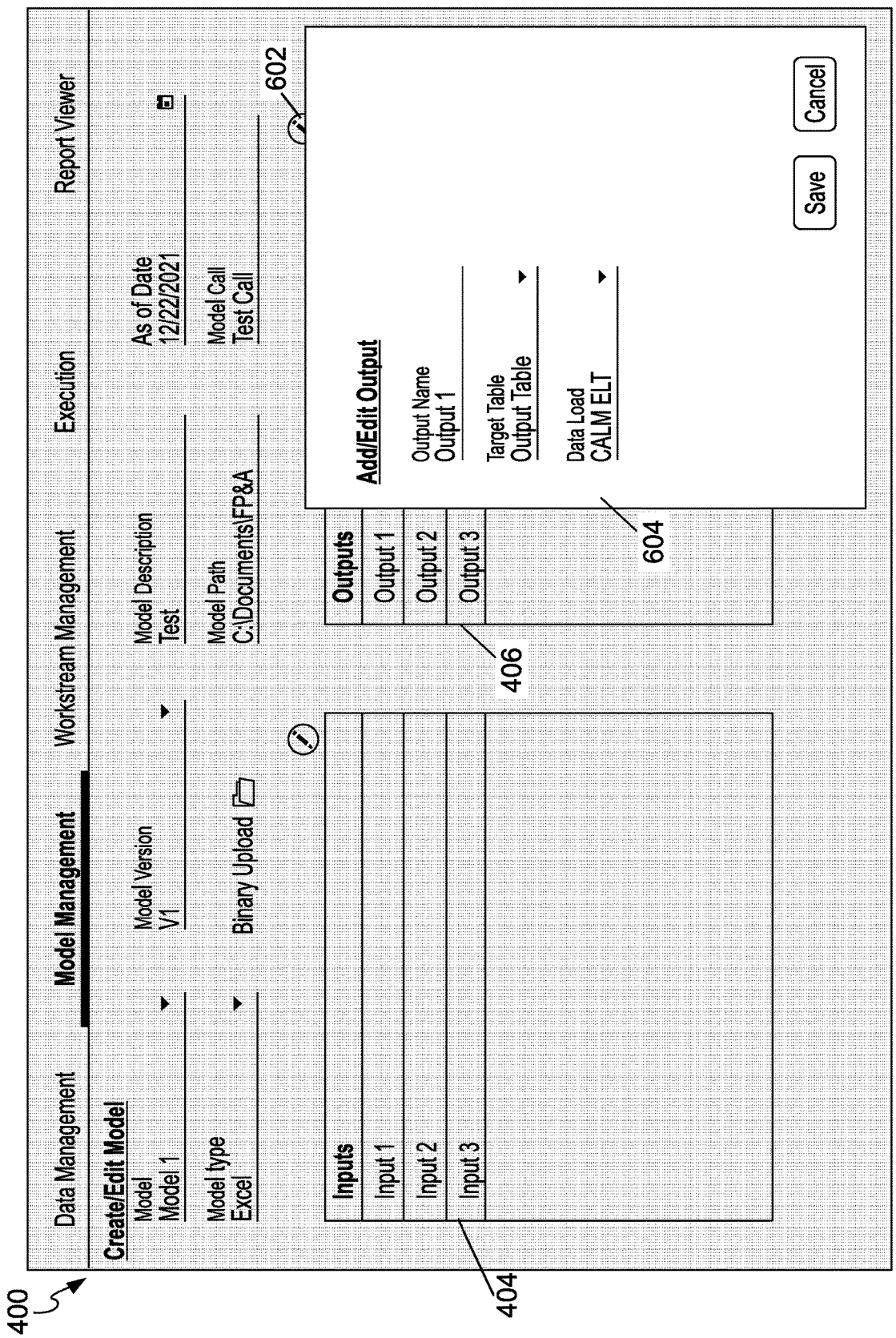
FIG. 6 shows another example user interface generated by the orchestration server of FIG. 2.

Referring now to FIGS. 4-6, an example interface 400 is shown for managing the models that makeup the workstream 350. Generally, the interface 400 allows for information about a model to be defined and manipulated.

For instance, the interface 400 includes a model definition section 402 that allows for the metadata associated with a model ("Model 1") to be defined. Such metadata can include, without limitation: name; version; description providing detail of subject matter; date; type (e.g., "Excel"); and call to invoke.

The interface 400 also includes an input section 404 and an output section 406 that allows for the definition of the inputs and the outputs for the model.

The input section 404 allows for the inputs for the model to be defined. For example, a control button 502 allows for adding or editing inputs listed in the input section 404. Upon selection of the control button 502, a pop-up interface 504 is generated that allows for the inputs to the model to be added or edited. In the example shown in FIG. 5, a specific input ("Input 1") is defined, including at least: name; type of input; source for input; and extraction technique for input.

The output section 406 allows for the outputs for the model to be defined. Upon selection of the control button 602, a pop-up interface 604 is generated that allows for the inputs to the model to be added or edited. In the example shown in FIG. 6, a specific output ("Output 1") is defined, including at least: name; target; and data format.

Figure 7:
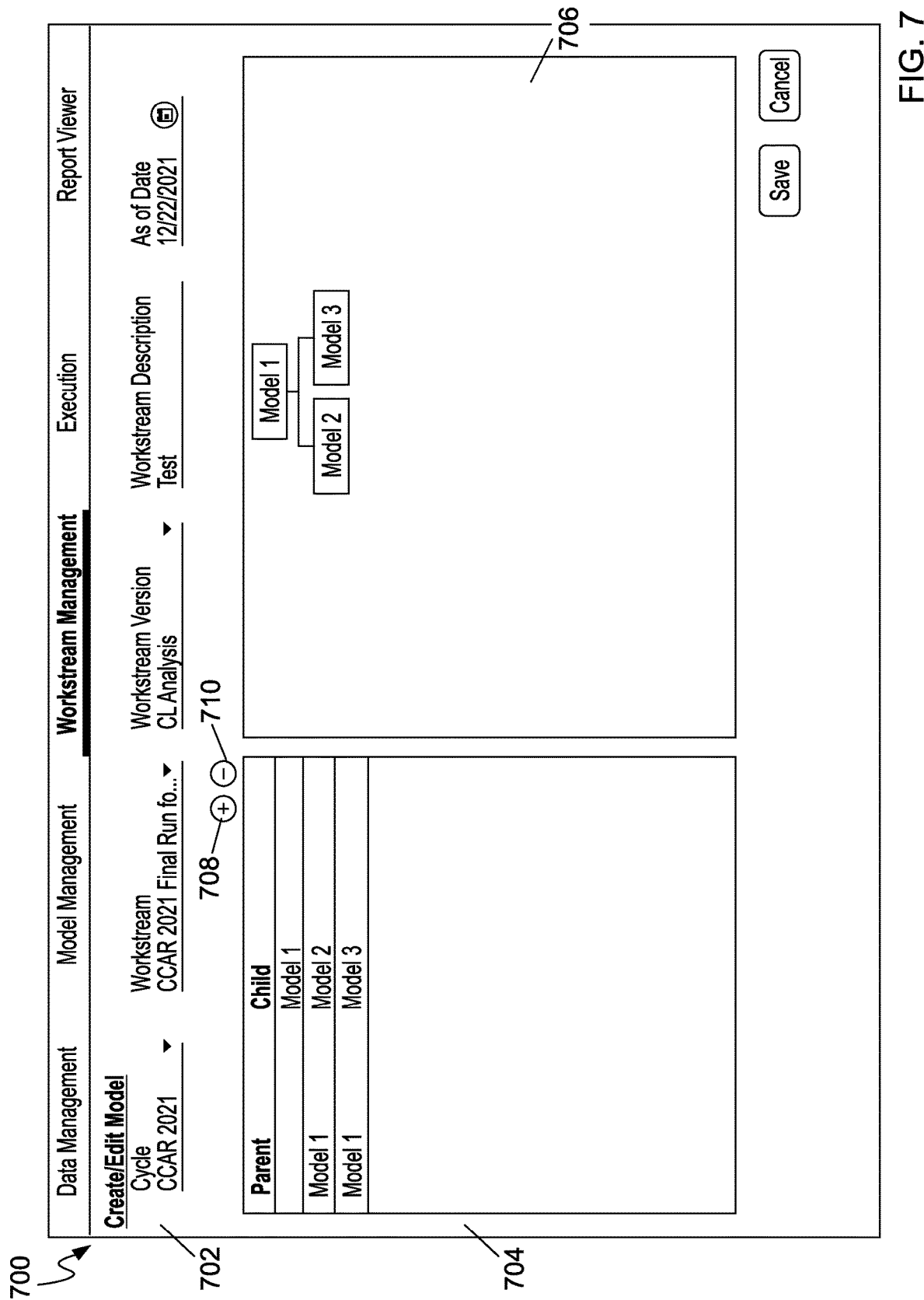
FIG. 7 shows another example user interface generated by the orchestration server of FIG. 2.
Figure 8:
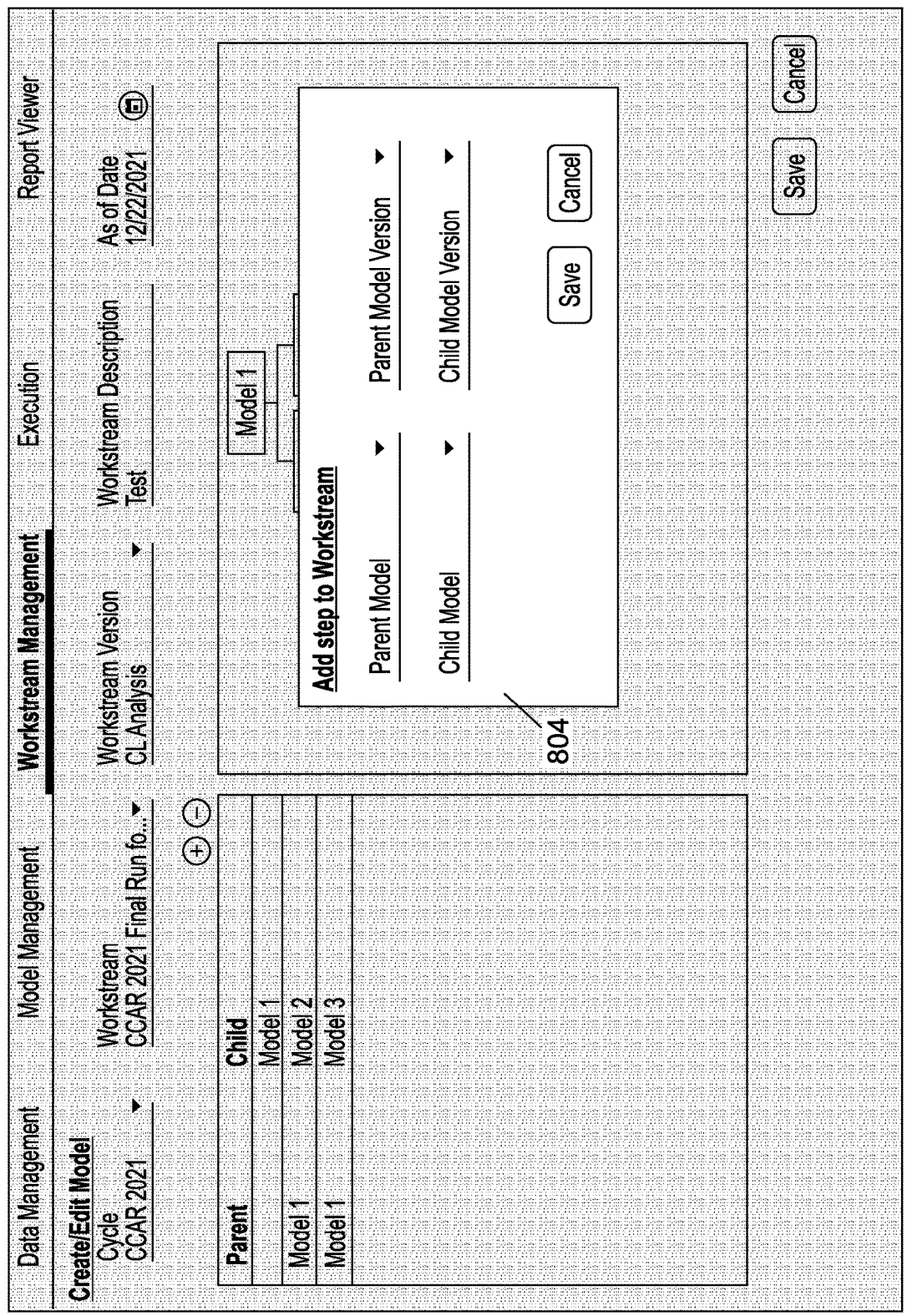
FIG. 8 shows another example user interface generated by the orchestration server of FIG. 2.
Figure 9:
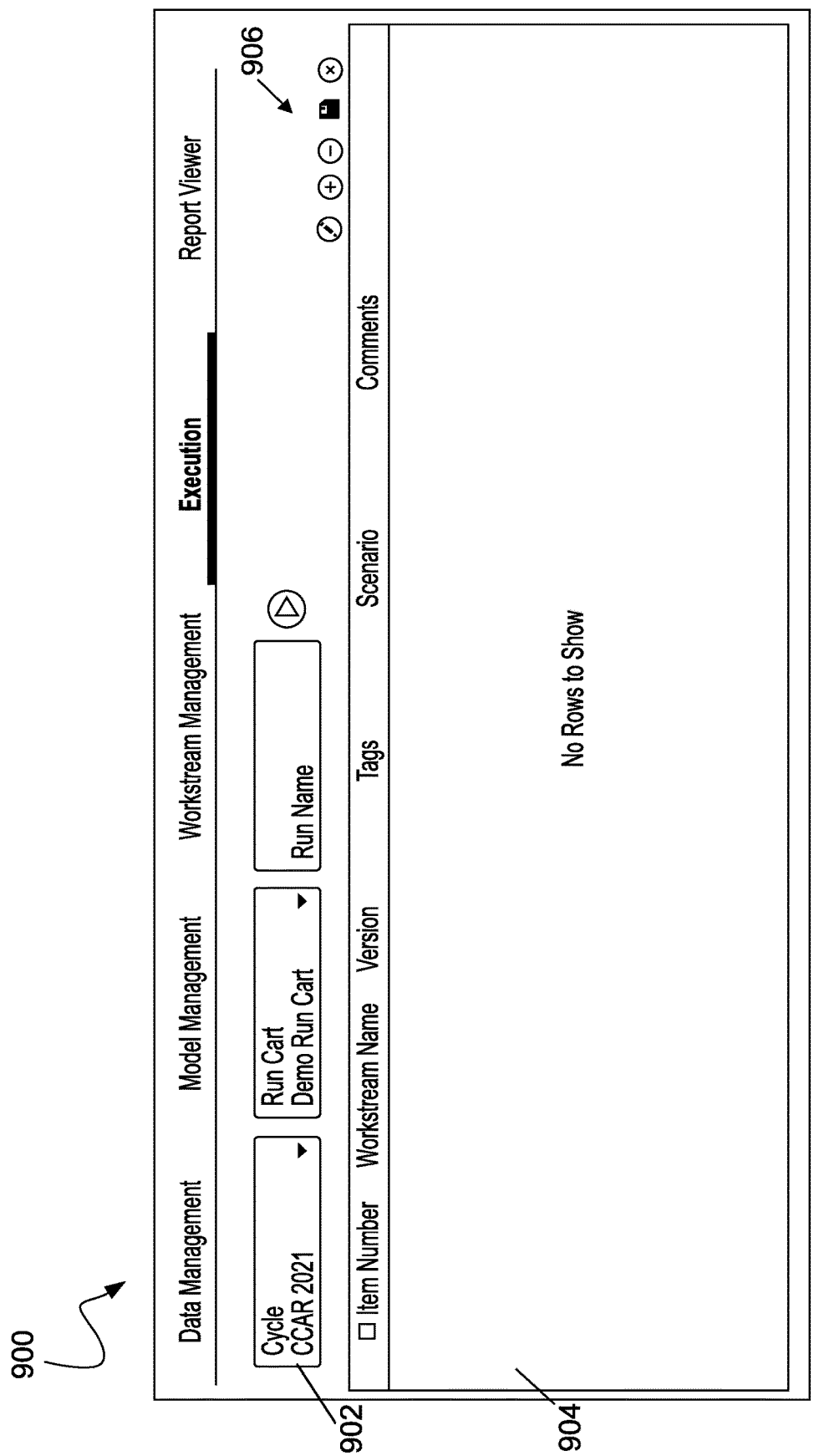
FIG. 9 shows another example user interface generated by the orchestration server of FIG. 2.

Referring now to FIGS. 7-9, another example interface 700 is shown for managing the workstream 350. Generally, the interface 700 allows for information about the workstream 350 to be defined and manipulated.

For instance, the interface 700 includes a workstream definition section 702 that allows for the metadata associated with the workstream 350 (e.g., "CCAR 2021 . . . ") to be defined. Such metadata can include, without limitation: cycle defining a series of workstreams have commonality; name; version; description providing detail of subject matter; and date.

The interface 700 also has a model list section 704 that lists the models included in the workstream 350. The model list section 704 lists each model, including indicating the parent and child for each model. For instance, "Model 1" is listed as the parent for "Model 2" in the model list section 704.

The interface 700 also has a visual representation section 706 that provides a visual depiction of the models included in the workstream 350. In this instance, the "Model 1" is shown as the parent for the "Model 2" and "Model 3" in the workstream 350.

Controls 708, 710 are programmed to allow for models to be added and removed from the workstream 350 depicted in the interface 700. For instance, upon selection of the control 708, a model can be added to the workstream 350.

Specifically, upon selection of the control 708, a pop-up interface 804 is generated that allows for a model to be added to the workstream 350. The pop-up interface 804 allows for the selection of both the parent and child models, along with versioning for this models. Similarly, the control 710 can be selected for removal of one or more of the models in the workstream 350.

Referring now to FIGS. 9-13, another example user interface 900 is shown as generated by the orchestration server 122 and accessed by the client device 112. This user interface 900 provides for execution of the workstream 350.

In this example, the user interface 900 includes an information section 902 that identifies the workstream(s) shown in the user interface 900, along with other information about the workstream(s), such as the names, versions, etc. associated with the workstream(s).

The user interface 900 also includes a space 904 listing each of the workstreams that have been selected for execution. In FIG. 9, no workstreams have yet been selected. A series of controls 906 allow the user to edit, add, and remove workstream(s) that are included for execution.

Figure 11:
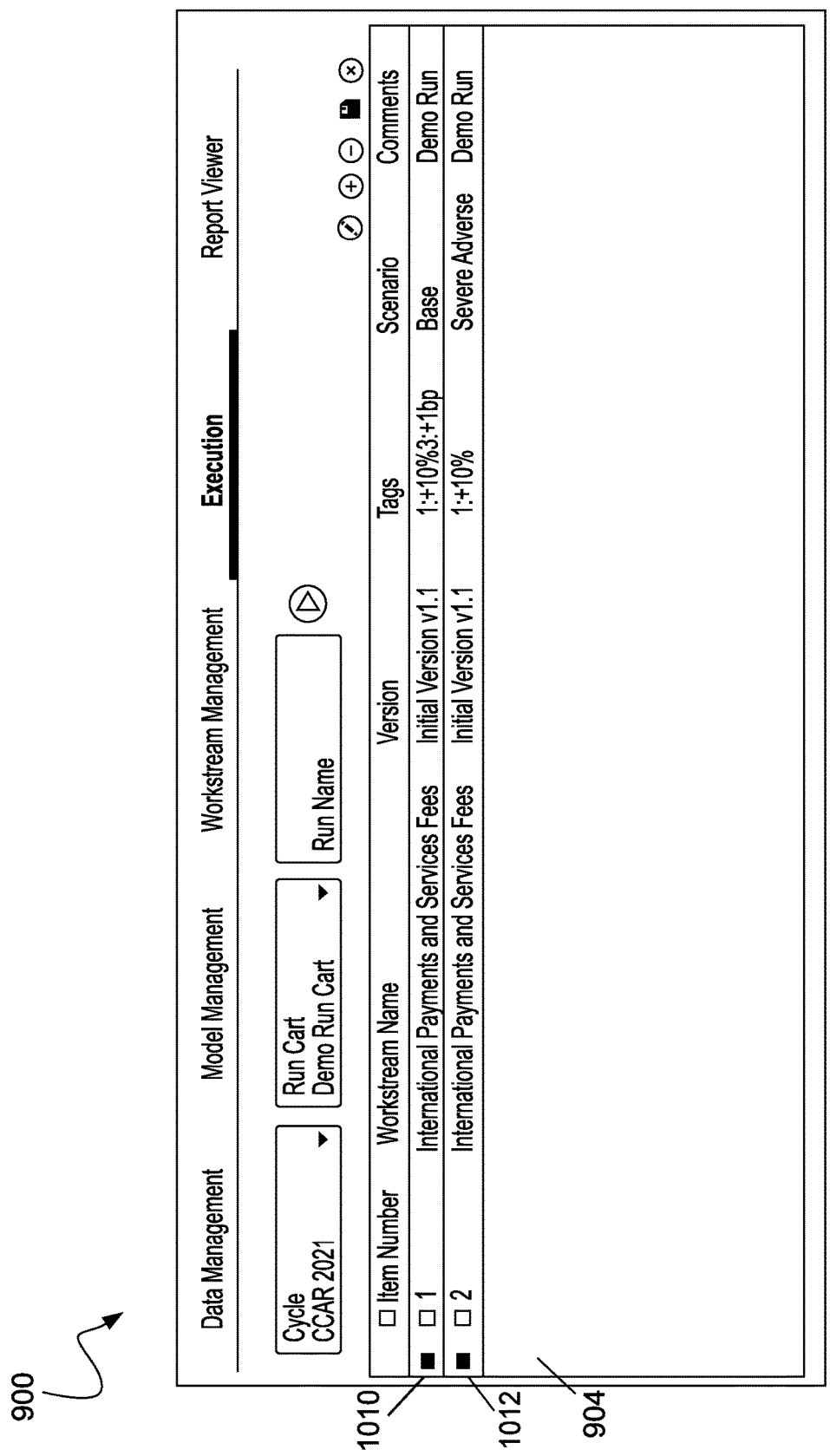
FIG. 11 shows another example user interface generated by the orchestration server of FIG. 2.

Referring to FIGS. 10-13, upon selection of an add button from the controls 906, a workstream can be added to the user interface 900. In this example, a pop-up interface 1004 is generated that allows for the selection of workstreams 1010, 1012 to be included for execution in the user interface 900. In this example, each of the workstreams 1010, 1012 listed in the pop-up interface 1004 can include information including the workstream's name and category. Upon selection of the workstreams 1010, 1012, the workstreams 1010, 1012 are listed in the space 904, as shown in FIG. 11.

Figure 12:
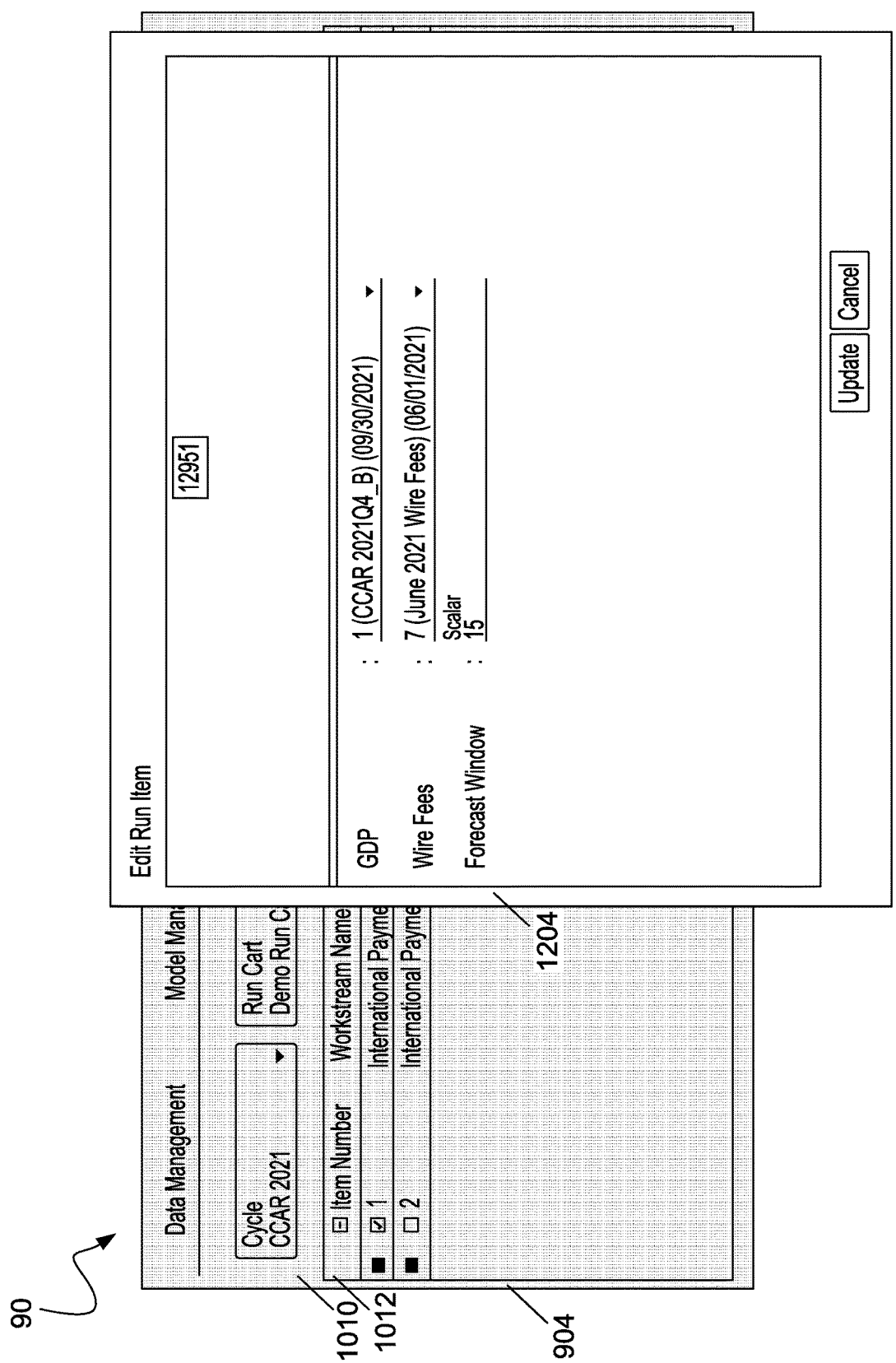
FIG. 12 shows another example user interface generated by the orchestration server of FIG. 2.

As shown in FIG. 12, the workstream 1010 is selected and an edit button is selected from the controls 906. This spawns a pop-up interface 1204 that allows aspects of the workstream 1010 to be changed. In this example, variables associated with the workstream 1010 can be edited, such as a date range for wire fees and a size of a forecast windows.

Figure 13:
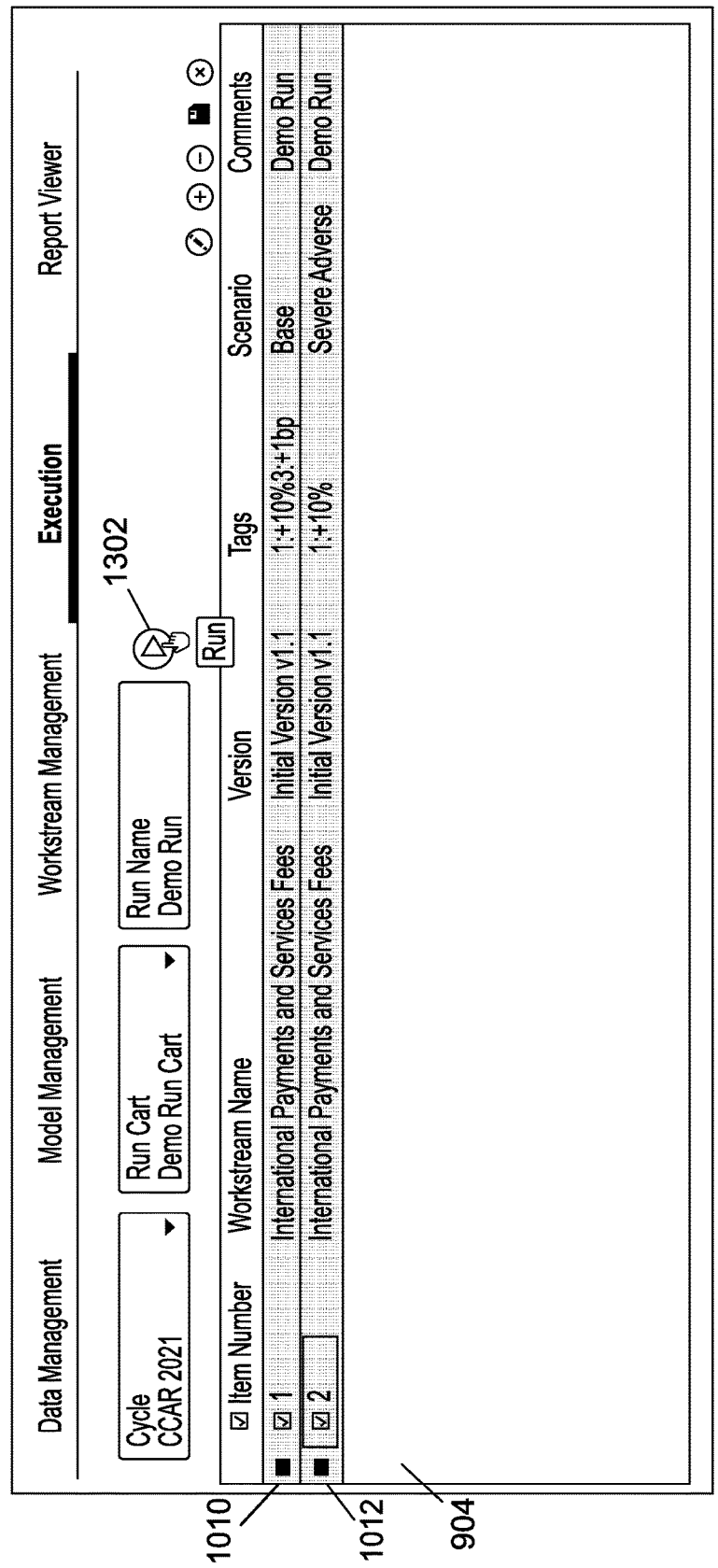
FIG. 13 shows another example user interface generated by the orchestration server of FIG. 2.

In FIG. 13, once the workstreams listed in the space 904 are configured as desired, an execute button 1302 is selectable to run the workstreams. Upon receipt of selection of the execute button 1302, the orchestration server 122 communicates with the database 126 and the execution queue 132 as described herein to run the models as defined in each of the workstreams 1010, 1012.

Figure 14:
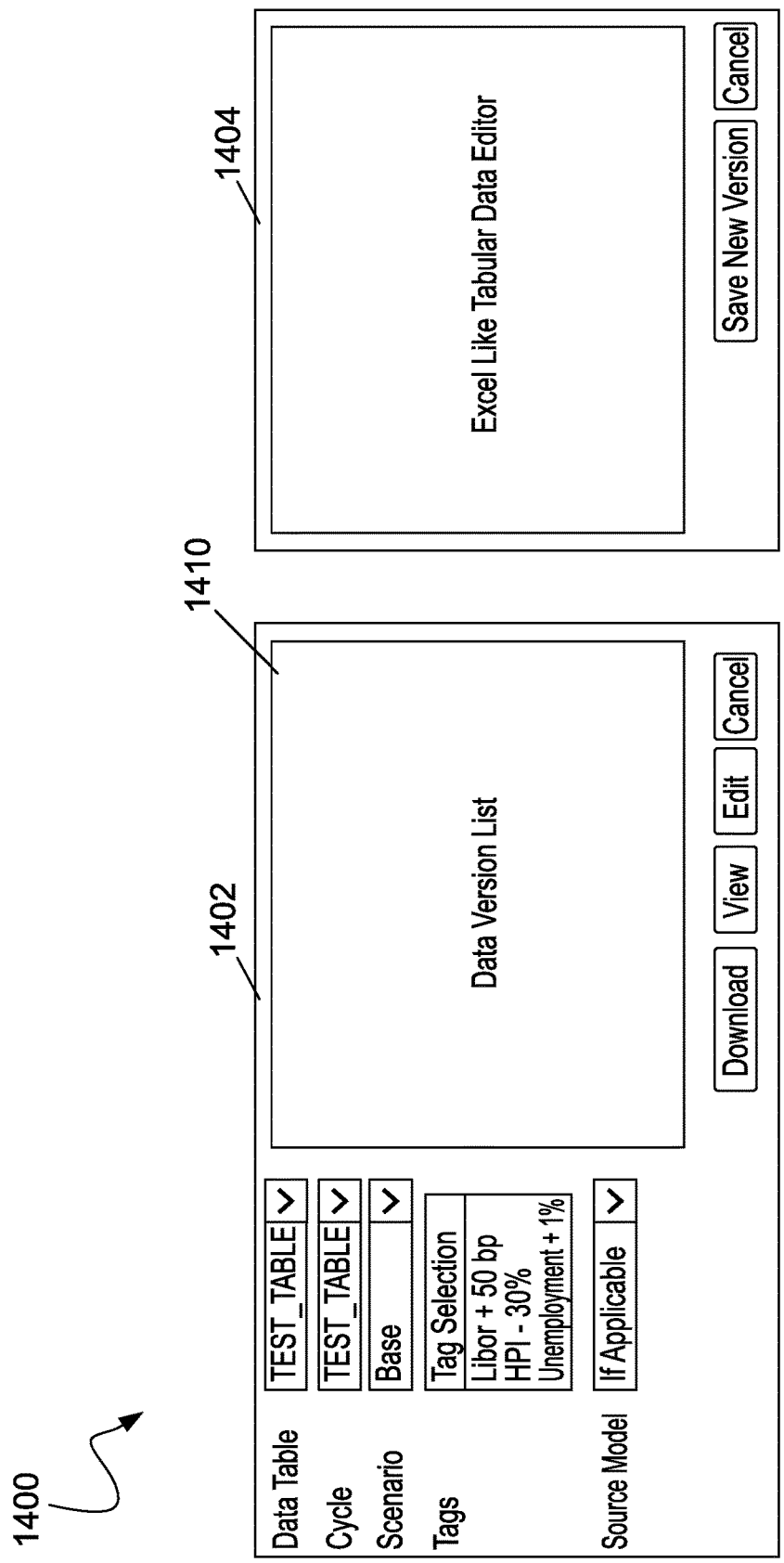
FIG. 14 shows another example user interface generated by the orchestration server of FIG. 2.

Referring now to FIG. 14, another example interface 1400 of the orchestration server 122 is shown. This example interface 1400 allows for the data for a particular model of a workstream to be edited.

The interface 1400 includes a data version window 1402 that lists metadata associated with the depicted data. This metadata includes the data table from which the data is taken, typically defined by the specific model ("Source Model"). A cycle defines the cycle to which the workstream associated with the model is linked. A scenario defines a specific version of the cycle. Tags are provided that indicate variable inputs to the model. Finally, the data version window 1402 includes a data version list window 1410 that lists all the different versions of the data available on the system 100.

The interface 1400 also includes a data editor window 1404 that displays the data in a format that can be edited. For instance, the data can be displayed in a table format, such as an Excel-like table. The data editor window 1404 allows the displayed data to be edited, including data added, removed, and/or changed.

In the examples provided, the system 100 provides versioning control. In the embodiment shown, the versioning control can be defined on various levels.

For instance, the example orchestration server 122 can be programmed to provide versioning of data associated with sources, processes, and/or execution. In this example, the versioning control includes at least three levels: (i) data/metadata versioning; (ii) workstream versioning; and (iii) model versioning.

In these examples, the versioning control can be metadata driven. The orchestration server 122 can be programmed to store versions (e.g., data and/or binaries) in the database 126 to provide the versioning control. Further, the orchestration server 122 can be programmed to provide source code control, defining a repository and check-in/check-out control.

In yet other examples, the versioning control can be used to track changes to optimize execution of the workstream. For instance, the versioning control can track changes to a data source and only re-upload changed portions of that data source for execution of the workstream. This can allow for a more efficient system, particularly when a data source is large and requires significant resources for manipulation and transfer. Many other configurations are possible.

Figure 15:
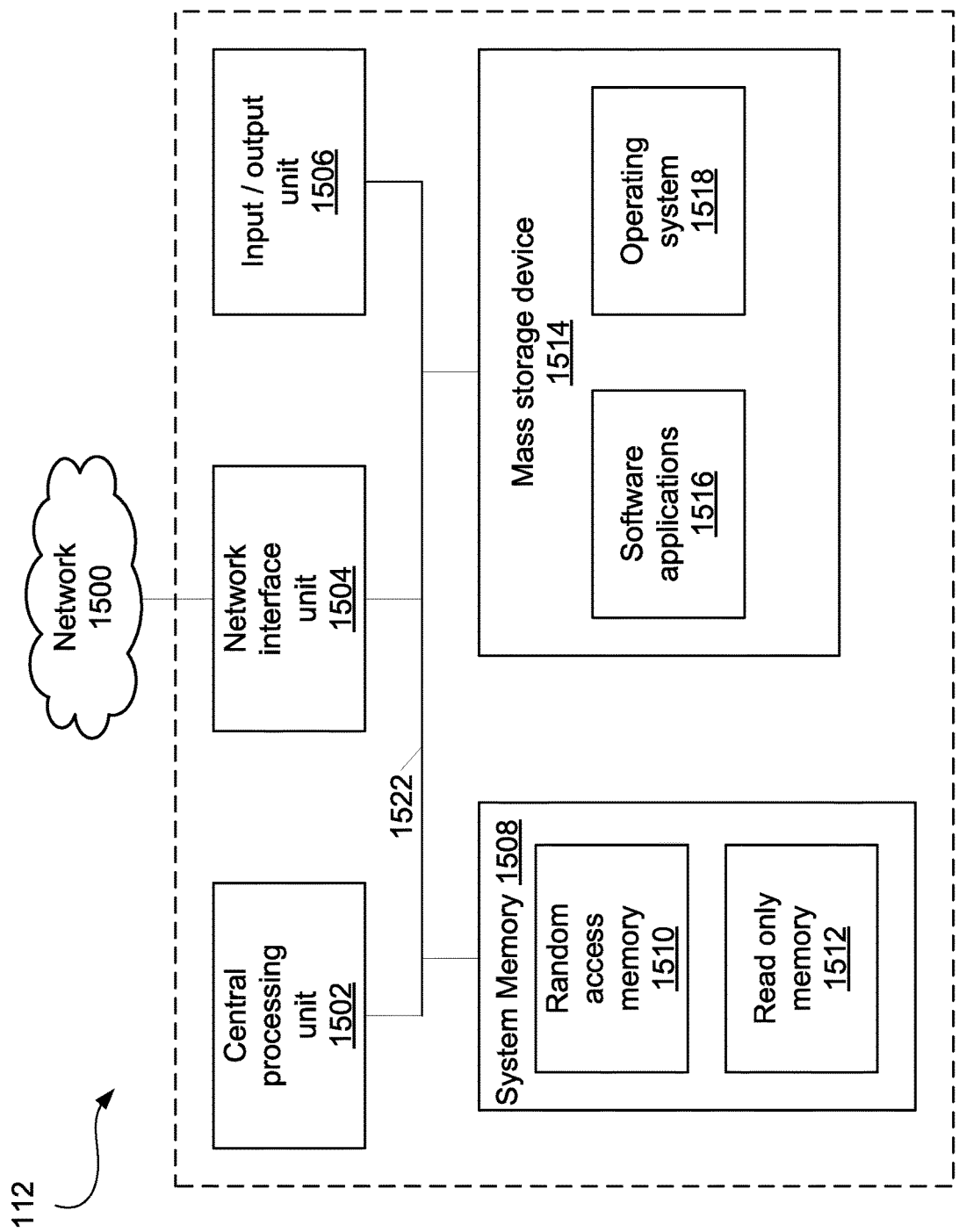
FIG. 15 shows example components of the orchestration server of FIG. 2.

FIG. 15 schematically shows example physical components of portions of the system 100 of FIG. 1. In particular, additional components of the orchestration server 122 are illustrated. In this example, the orchestration server 122 provides the computing resources to perform the functionality associated with the system 100 (FIG. 1). The other computing resources associated with the system 100 can be similarly configured.

The orchestration server 122 can be an internally controlled and managed device (or multiple devices) of the business enterprise, e.g., the financial institution. Alternatively, the orchestration server 122 can represent one or more devices operating in a shared computing system external to the enterprise or institution, such as a cloud.

Via a network 1500, the components of the orchestration server 122 that are physically remote from one another can interact with one another.

The orchestration server 122 includes a central processing unit or processor 1502, a system memory 1508, and a system bus 1522 that couples the system memory 1508 to the processor 1502.

The system memory 18 includes a random access memory ("RAM") 1510 and a read-only memory ("ROM") 1512. A basic input/output system that contains the basic routines that help to transfer information between elements within the orchestration server 122, such as during startup, is stored in the ROM 1512.

The orchestration server 122 further includes a mass storage device 1514. The mass storage device 1514 is able to store software instructions and data.

The mass storage device 1514 is connected to the processor 1502 through a mass storage controller (not shown) connected to the system bus 1522. The mass storage device 1514 and its associated computer-readable data storage media provide non-volatile, non-transitory storage for the orchestration server 122. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the orchestration server 122.

According to various embodiments of the invention, the orchestration server 122 may operate in a networked environment using logical connections to remote network devices through the network 1500, such as a wireless network, the Internet, or another type of network. The orchestration server 122 may connect to the network 1500 through a network interface unit 1504 connected to the system bus 1522. It should be appreciated that the network interface unit 1504 may also be utilized to connect to other types of networks and remote computing systems. The orchestration server 122 also includes an input/output unit 1506 for receiving and processing input from a number of other devices, including a touch user interface display screen, an audio input device, or another type of input device. Similarly, the input/output unit 1506 may provide output to a touch user interface display screen or other type of output device, including, for example, the I/O device 31 (FIG. 1).

As mentioned briefly above, the mass storage device 1514 and/or the RAM 210 of the orchestration server 122 can store software instructions and data. The software instructions include an operating system 1518 suitable for controlling the operation of the orchestration server 122. The mass storage device 1514 and/or the RAM 210 also store software instructions and applications 1516, that when executed by the processor 1502, cause the orchestration server 122 to provide the functionality described above.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system, comprising:
   at least one processor; and
   non-transitory computer-readable storage storing instructions that, when executed by the at least one processor, cause the system to:
   generate a configuration manager programmed to configure a workstream including a plurality of models, wherein the workstream defines metadata associated with execution of each of the plurality of models;
   generate an execution manager programmed to execute each of the plurality of models in the workstream according to the metadata; and
   generate a results manager programmed to access results of the execution of the workstream;
   wherein the configuration manager is programmed to define a visual depiction of the workstream showing each of the plurality of models and model dependencies associated therewith; and
   wherein the visual depiction includes a legend providing source information for the plurality of models depicted on the visual depiction.

2. The system of claim 1, wherein the execution manager is further programmed to programmatically execute a model of the plurality of models in the workstream.

3. The system of claim 2, wherein the model is a legacy model configured for manual execution.

4. The system of claim 2, wherein the execution manager includes a plurality of model runner nodes, wherein each of the plurality of model runner nodes is programmed to execute a different type of the plurality of models.

5. The system of claim 1, wherein the configuration manager defines an acyclic construction of the model dependencies.

6. The system of claim 1, wherein the configuration manager is programmed to allow a first model to be added to the workstream and a second model to be removed from the workstream.

7. The system of claim 1, wherein the configuration manager visually maps each upstream model and each downstream model for the plurality of models in the workstream.

8. The system of claim 1, comprising further instructions that, when executed by the at least one processor, cause the system to define a versioning for the workstream.

9. The system of claim 8, wherein the versioning includes:
   a first versioning for the data and the metadata associated with the plurality of models in the workstream;
   a second versioning for the workstream; and
   a third versioning for each of the plurality of models in the workstream.

10. A computer implemented method, comprising:
    generating a configuration manager programmed to configure a workstream including a plurality of models, wherein the workstream defines metadata associated with execution of each of the plurality of models;
    generating an execution manager programmed to execute each of the plurality of models in the workstream according to the metadata; and
    generating a results manager programmed to access results of the execution of the workstream;
    wherein the configuration manager is programmed to define a visual depiction of the workstream showing each of the plurality of models and model dependencies associated therewith; and
    wherein the visual depiction includes a legend providing source information for the plurality of models depicted on the visual depiction.

11. The method of claim 10, wherein the execution manager is further programmed to programmatically execute a model of the plurality of models in the workstream.

12. The method of claim 11, wherein the model is a legacy model configured for manual execution.

13. The method of claim 11, wherein the execution manager includes a plurality of model runner nodes, wherein each of the plurality of model runner nodes is programmed to execute a different type of the plurality of models.

14. The method of claim 10, wherein the configuration manager defines an acyclic construction of the model dependencies.

15. The method of claim 10, wherein the configuration manager is programmed to allow a first model to be added to the workstream and a second model to be removed from the workstream.

16. The method of claim 10, wherein the configuration manager visually maps each upstream model and each downstream model for the plurality of models in the workstream.

17. The method of claim 10, further comprising defining a versioning for the workstream.

18. The method of claim 17, wherein the versioning includes:
- a first versioning for the data and the metadata associated with the plurality of models in the workstream;
- a second versioning for the workstream; and
- a third versioning for each of the plurality of models in the workstream.

\* \* \* \* \*